United States Patent
Walters et al.

(10) Patent No.: US 12,487,935 B1
(45) Date of Patent: Dec. 2, 2025

(54) DETECTING AND MITIGATING FALSE STRUCTURE SHARING WITHIN A CACHE LINE

(71) Applicant: International Business Machines Corporation, Armonk, NY (US)

(72) Inventors: Craig R Walters, Highland, NY (US); Ram Sai Manoj Bamdhamravuri, Austin, TX (US); Deanna Postles Dunn Berger, Hyde Park, NY (US); Dominic Ditomaso, Hyde Park, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/731,468

(22) Filed: Jun. 3, 2024

(51) Int. Cl.
| | |
|---|---|
| G06F 12/08 | (2016.01) |
| G06F 12/02 | (2006.01) |
| G06F 12/084 | (2016.01) |
| G06F 13/16 | (2006.01) |

(52) U.S. Cl.
CPC ........ *G06F 12/084* (2013.01); *G06F 12/0292* (2013.01); *G06F 13/1663* (2013.01)

(58) Field of Classification Search
CPC . G06F 12/084; G06F 12/0292; G06F 13/1663
USPC ........................................................ 711/118
See application file for complete search history.

(56) References Cited

U.S. PATENT DOCUMENTS

| | | | |
|---|---|---|---|
| 5,680,576 A | 10/1997 | Laudon | |
| 7,418,559 B2 | 8/2008 | Hosoe et al. | |
| 8,677,081 B1 | 3/2014 | Wentzlaff et al. | |
| 9,076,530 B2 | 7/2015 | Gomez et al. | |
| 9,354,885 B1 | 5/2016 | Gschwind et al. | |
| 9,971,700 B2 | 5/2018 | Loh | |
| 10,579,525 B2 | 3/2020 | Zoellin et al. | |
| 10,585,800 B2 | 3/2020 | Zoellin et al. | |
| 10,671,532 B2 | 6/2020 | Zoellin et al. | |
| 10,761,990 B2 | 9/2020 | Xu et al. | |
| 11,010,298 B2 | 5/2021 | Zoellin et al. | |
| 11,347,699 B2 | 5/2022 | Carpenter et al. | |

(Continued)

OTHER PUBLICATIONS

Filanovsky et al., "Seeing through hardware counters: a journey to threefold performance increase", URL: https://netflixtechblog.com/seeing-through-hardware-counters-a-journey-to-threefold-performance-increase-2721924a2822, 2022, 17 pgs.

*Primary Examiner* — Hua J Song
(74) *Attorney, Agent, or Firm* — Cantor Colburn LLP; Edward Wixted (57) ABSTRACT

Examples described herein provide a computer-implemented method that includes generating an extended hot line table that tracks cross-core contended cache lines for multiple processors of a processing system based on cache requests, the extended hot line table storing at least metadata for a cross-core contended cache line. The method further includes polling, using firmware, the extended hot line table in each of the multiple processors of the processing system to identify contention information. The method further includes aggregating the contention information from each of the multiple processors to generate aggregated contention information. The method further includes processing subsequent cache requests using the aggregated contention information.

20 Claims, 7 Drawing Sheets

(56) References Cited

U.S. PATENT DOCUMENTS

| | | | |
|---|---|---|---|
| 11,586,542 B2 | 2/2023 | Zoellin et al. | |
| 11,586,552 B2 | 2/2023 | Granovsky et al. | |
| 2015/0089152 A1* | 3/2015 | Busaba | G06F 12/0831 711/141 |
| 2018/0365151 A1* | 12/2018 | Zoellin | G06F 12/0828 |
| 2021/0232502 A1 | 7/2021 | Zoellin et al. | |
| 2022/0365881 A1 | 11/2022 | Granovsky et al. | |
| 2023/0153244 A1 | 5/2023 | Zoellin et al. | |

* cited by examiner

FIG. 5A — Table 500

| C | P | Line Address A |
|---|---|---|
| C | P | Line Address B |
| C | P | Line Address C |
| C | P | Line Address D |

FIG. 5B — Table 501

| Active | State | Address A |
|---|---|---|
| Active | State | Address B |
| Active | State | Address C |
| Active | State | Address D |

FIG. 6 — Table 600

| Virtual Address | Sub-Line Offset Start | Sub-Line Offset End | Intercept Address | Sub-Line Offset |
|---|---|---|---|---|
| A | 0 | 4 | W | 0 |
| A | 5 | 7 | X | 0 |
| B | 0 | 6 | Y | 0 |
| B | 7 | 7 | Z | 0 |

DETECTING AND MITIGATING FALSE STRUCTURE SHARING WITHIN A CACHE LINE

BACKGROUND

The present disclosure relates to computing systems, and more specifically, to detecting and mitigating false structure sharing within a cache line.

Symmetric multiprocessing (SMP) systems are a type of computing system that utilize a multiprocessor hardware and software architecture. Two or more processors are connected to a single, shared main memory. For example, an SMP system can have a centralized shared memory that operates using a single operating system with two or more processors. Each processor can utilize its own cache memory (or simply "cache") to speed up data access to the shared memory and to reduce the system bus traffic. Some SMP systems can utilize multiple cache memories and/or multiple levels of cache memory that may be shared between and among various processors.

SUMMARY

In one embodiment, a method is provided. The method includes generating an extended hot line table that tracks cross-core contended cache lines for multiple processors of a processing system based on cache requests, the extended hot line table storing at least metadata for a cross-core contended cache line. The method further includes polling, using firmware, the extended hot line table in each of the multiple processors of the processing system to identify contention information. The method further includes aggregating the contention information from each of the multiple processors to generate aggregated contention information. The method further includes processing subsequent cache requests using the aggregated contention information.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

The detailed description explains embodiments of the disclosure, together with advantages and features, by way of example with reference to the drawings.

DETAILED DESCRIPTION

Computing systems, such as SMP systems utilize shared data that can be stored in caches. Processors in a computing system, such as an SMP system, can employ local caches, such as, for example, to improve access latency to instructions, and/or data, used by a processor (e.g., in executing instructions). However, a plurality of processors sharing data can lead to contention for that data among the processors. The contention can cause an increase in the frequency of transferring data between caches in various processors, particularly if one processor modifies a cache line shared by other processors, creating an incoherent data problem for the caches of the other processors and requiring the other processors to fetch a copy of the modified cache line. This problem is referred to as false structure sharing within a cache line. Increasing the frequency of transferring data, such as cache lines, can limit or reduce progress of a program, and/or increase the relative time spent transferring data, as opposed to using the data. Transferring cache lines between processors has an associated overhead (e.g., transfer latency, and HW resource (e.g., controller state machine, data buffer, access pipeline, bus or inter-processor link, etc.) utilization. A high, or increased, frequency of transferring data between processors correspondingly increases the associated overhead, which can limit or reduce performance of processors and/or the overall computing system.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
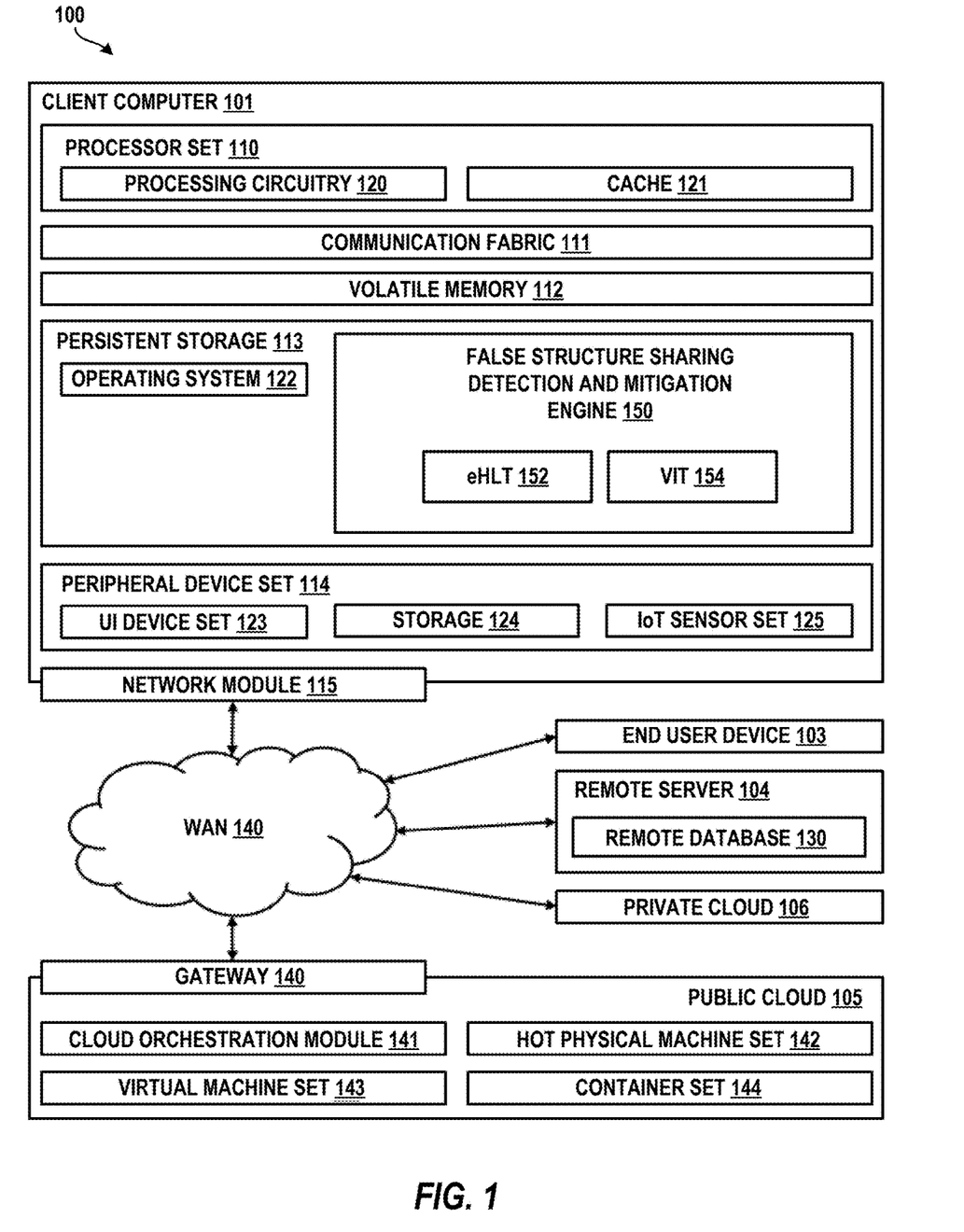
FIG. 1 depicts a processing system for implementing the techniques described herein according to one or more embodiments.

FIG. 1 illustrates a computing environment 100, according to an embodiment. Computing environment 100 contains an example of an environment for the execution of at least some of the computer code involved in performing the inventive methods, such as a false structure sharing detection and mitigation engine 150, which may be used to detect and mitigate false structure sharing within a cache line of a cache (e.g., cache 121). According to one or more embodiments, the false structure sharing detection and mitigation engine 150 includes an eHLT 152. According to one or more embodiments, the false structure sharing detection and mitigation engine 150 also includes a VIT 154. In addition to false structure sharing detection and mitigation engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and false structure sharing detection and mitigation engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in false structure sharing detection and mitigation engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in theorem prover engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
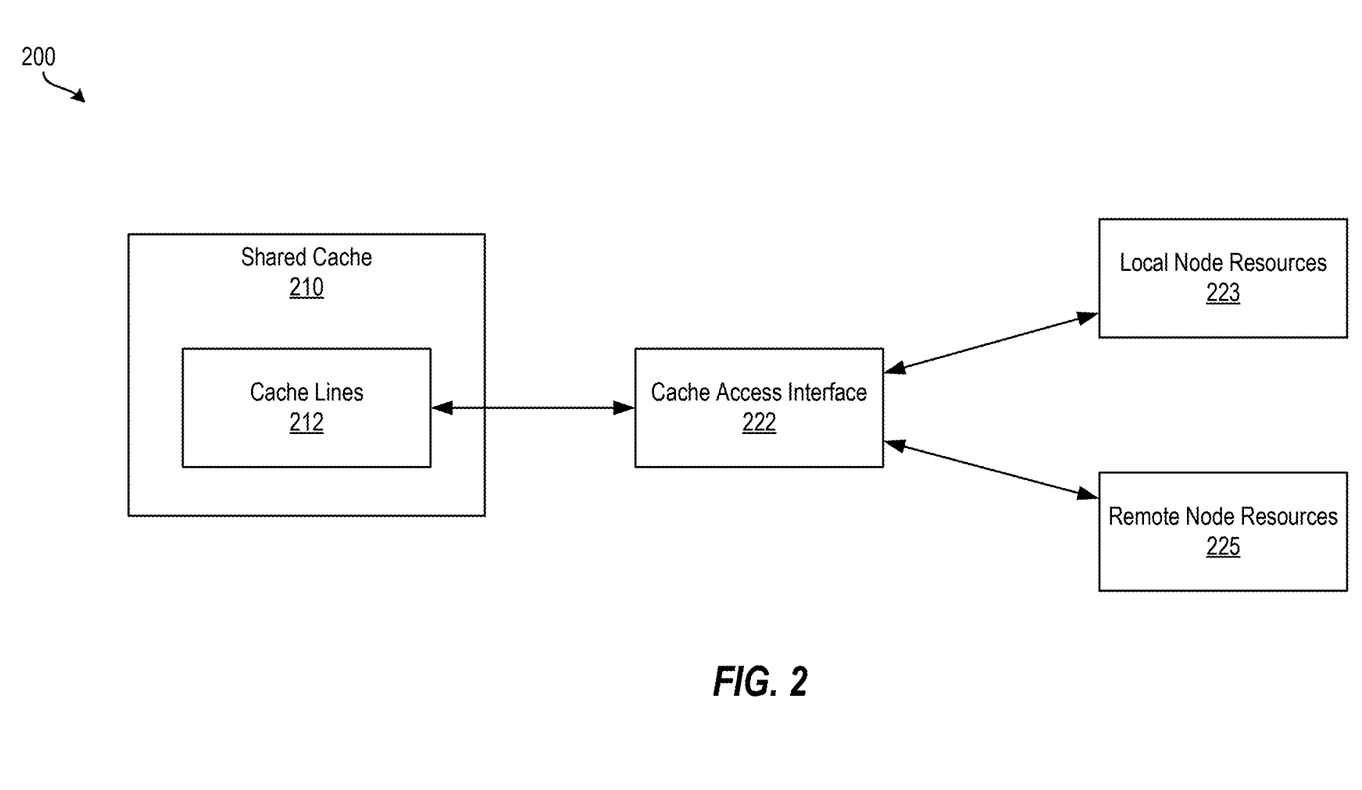
FIG. 2 depicts a node of a multi-node processing system according to one or more embodiments.

FIG. 2 depicts a node 200 of a multi-node processing system according to one or more embodiments. The node 200 can be a portion of a symmetric multiprocessing (SMP) system, for example, or another suitable type of processing system.

The node 200 includes a shared cache 210 that is shared by local node resources 223 and remote node resources 225 configured and arranged as shown. The local node resources 223 access cache lines 212 in the shared cache 210 via a cache access interface 222. Similarly, the remote node resources 225 access cache lines 212 via the cache access interface 222.

Figure 3:
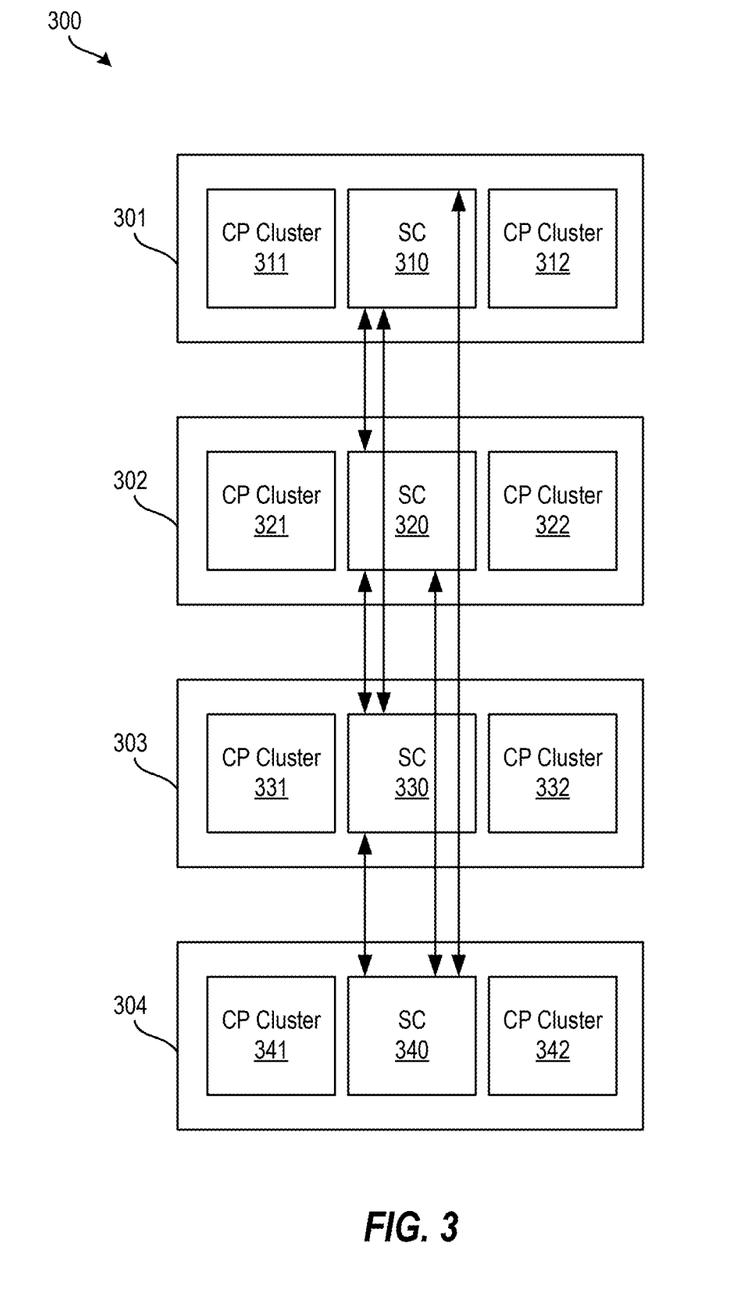
FIG. 3 depicts a multi-node processing system according to one or more embodiments.

FIG. 3 depicts a multi-node processing system 300 including a plurality of interconnected drawers 301, 302, 303, 304 according to one or more embodiments Each of the drawers 301-304 includes two central processor (CP) clusters and a shared cache (SC) chip configured and arranged as shown. For example, the drawer 301 includes a CP cluster 311, a CP cluster 312, and an SC chip 310; the drawer 302 includes a CP cluster 321, a CP cluster 322, and an SC chip 320; the drawer 302 includes a CP cluster 331, a CP cluster 332, and an SC chip 330; and the drawer 304 includes a CP cluster 341, a CP cluster 342, and an SC chip 340.

As shown in FIG. 3, each of the SC chips 310, 320, 330, 340 are fully interconnected. That is, SC chip 310 is communicatively connected directly to SC chips 320, 330, 340; SC chip 320 is communicatively connected directly to SC chip 310, 330, 340; SC chip 330 is communicatively connected directly to SC chips 310, 320, 340; and SC chip 340 is communicatively connected directly to SC chips 310, 320, 330. Although not shown, each SC chip 310, 320, 330, 340 is also communicatively connected to its respective CP clusters (e.g., the SC chip 310 is communicatively connected to the CP cluster 311 and the CP cluster 312, the SC chip 320 is communicatively connected to the CP cluster 321 and the CP cluster 322, etc.). Additionally, each SC chip 310, 320, 330, 340 includes an L4 cache (not shown).

Figure 4:
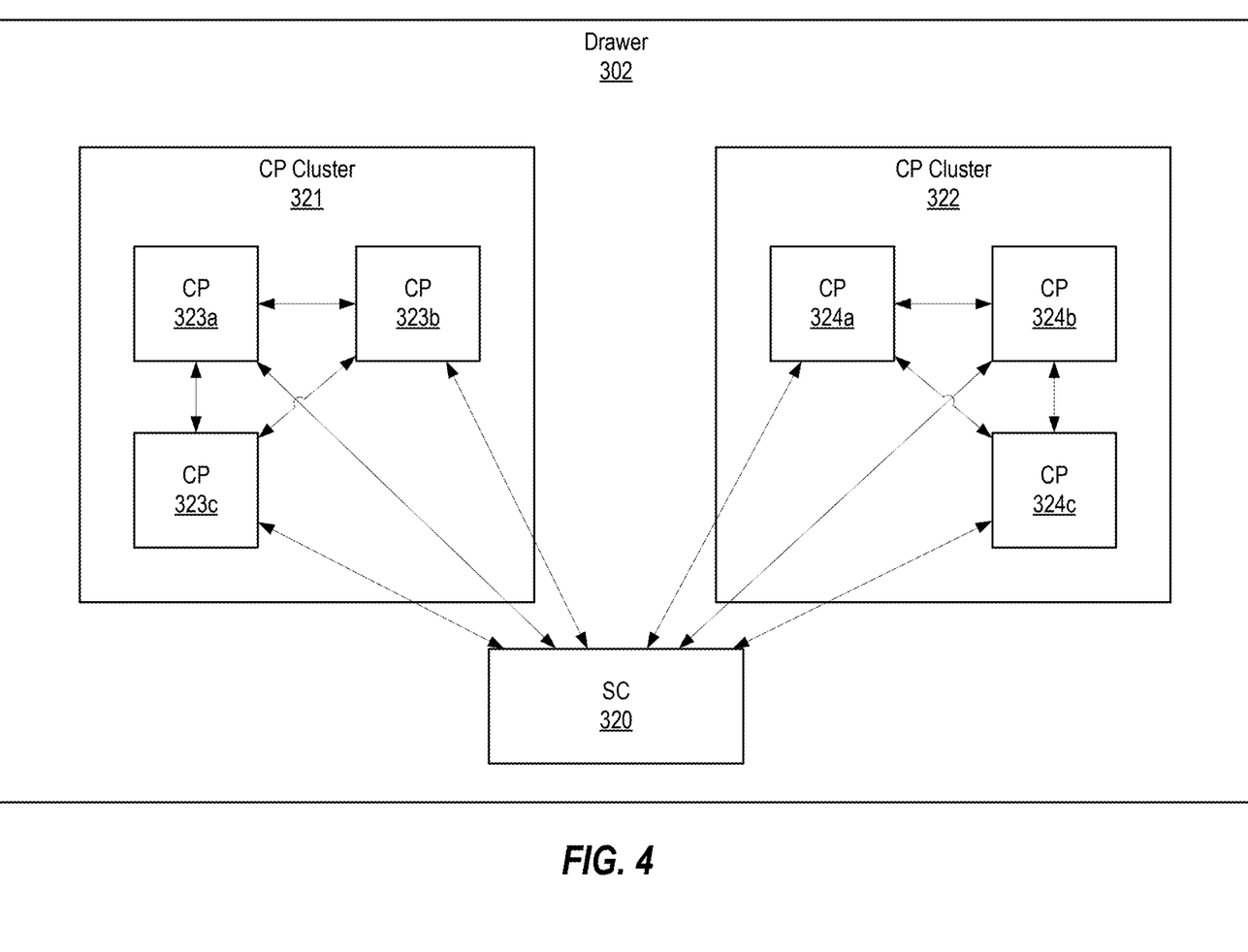
FIG. 4 depicts a drawer of the multi-node processing system of FIG. 3 according to one or more embodiments.

FIG. 4 depicts a drawer 302 of the multi-node processing system 300 of FIG. 3 according to one or more embodiments. The drawer 302 includes two CP clusters (e.g., CP cluster 321 and CP cluster 322). Each CP cluster contains individual CP chips. For example, CP cluster 321 contains CP chips 323a, 323b, 323c; and CP cluster 322 contains CP chips 324a, 324b, 324c. Each of the individual CP chips (e.g., CP chips 323a, 323b, 323c, 324a, 324b, 324c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP chip 323a includes multiple processing cores that each has its own L1/L2 cache, and the multiple processing cores within the CP chips 323a share an L3 cache.

The SC chip 320 includes interconnects for communication with each CP chip (e.g., CP chips 323a, 323b, 323c, 324a, 324b, 324c) in both clusters 321, 322 on the drawer 303 and for communication with other SC chips on other drawers (e.g., the SC chip 310 of the drawer 301, the SC chip 330 of the drawer 303, the SC chip 340 of the drawer 304, etc.).

Local node resources 223 of FIG. 2 may refer to resources that are local relative to a particular CP, CP cluster, or drawer. For example, local node resources 223 are resources local to the CP cluster 321 (e.g., the L1, L2, and L3 caches of the CP cluster 321 and its CP chips 323a, 323b, 323c), and the remote node resources 225 are resources other than those resources that are local to the CP cluster 321 (e.g., resources of the CP cluster 322).

It should be appreciated that the architecture shown in FIGS. 2-4 is only one possible example of a multi-node processing system, and other architectures are also possible.

In some situations, when the architecture of FIGS. 2-4 (or a similar architecture) is implemented, cache line contention may occur. Cache line contention refers to the situation where multiple processors (e.g., multiple CPs) or threads attempt to access the same cache line at the same time. Cache line contention can cause performance degradation of the computing system due to false sharing (e.g., multiple threads access different parts of the same cache line, but the line size obscures this granularity, forcing traditional cache coherency controls to assume full-line sharing), synchronization overhead (e.g., the overhand and delays caused by multiple processors or threads accessing and/or potentially modifying data within the same cache line), cache thrashing (e.g., frequent evection and reloading for heavily contended cache lines), and/or the like, including combinations and/or multiples thereof.

Existing industry processor designs commonly accept cache line contention, and, in particular, sub-line address contention, as an artifact of compiler and workload behavior. In large SMP systems, for example, these effects can significantly inhibit processor performance. These effects can also introduce code porting issues between platforms due to structural topology compatibility issues. For example, assumptions about cache line size, false and true line sharing, etc., can cause the performance and responsiveness of the same code to vary dramatically between platforms. Diagnosing the source of these types of issues can be extremely complex and costly in terms of the resources required to identify these issues.

One existing approach to addressing cache line contention focuses on identifying frequently accessed cross-core cache line addresses and suppressing subsequent speculative accesses. Another existing approach focuses on a cache directory that supports directory entries per sub-cache line block. Other approaches focus on a single address contention management (e.g., processor fetch-fetch connection) and hang avoidance mechanisms.

Figure 5A:
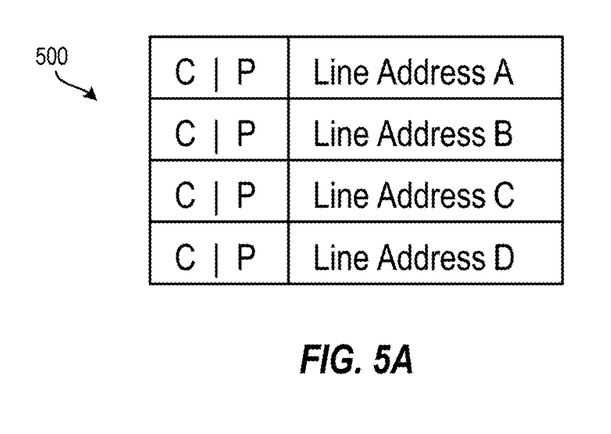
FIG. 5A depicts a hot line table.

Yet another approach addressing cache line contention identifies frequent cross-core contended full access line addresses via intervention notifications and throttles or alters existing processor activity, which is known as speculative accesses. This approach maintains core-internal table of a number "N" full line addresses, referred to as a hot line table (HLT). FIG. 5A depicts a HLT 500. A potential entry is created in the HLT 500 when a fetch is resolved within a processor cache hierarchy (also referred to as a "nest") indicating a line pulled from another core. An entry is confirmed when another processor fetches a line while the HLT 500 entry exists. On speculative access requests to confirmed HLT address, a processor inhibits speculative accesses.

While the HLT-based approach works well for fully contended cache line addresses (e.g., full 256B line actively contended), these contended addresses frequently contain independent data structures. For example, cache address A for 256B data block A contains eight independent software locking structures or control blocks with forty processors that poll these structures with varying frequencies. This is a problem with code running on the platform and the standard approach is to identify these cache lines and break them apart, which requires software to be recoding, recompiled and retested. Further, the existing HLT structure of the HLT-based approach is only hardware accessible so firmware and program products cannot access the HLT, leaving users to rely on instruction sampling, which can be time consuming and costly in terms of processing system resources (e.g., processing resources).

One or more embodiments described herein address these and other shortcomings by providing an extended hot line table (eHLT) that tracks state information related to cache entries.

Figure 5B:
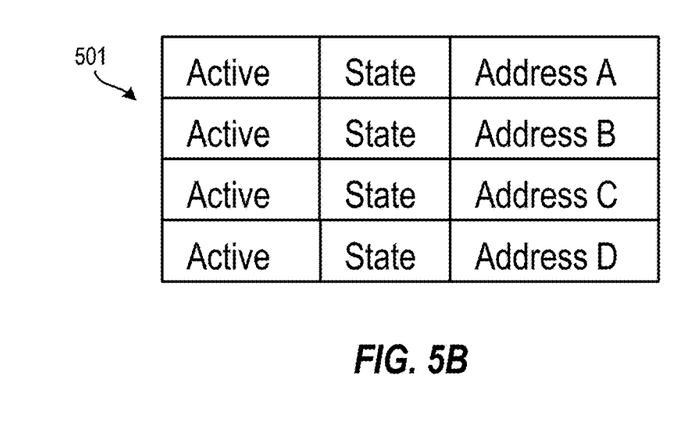
FIG. 5B depicts an extended hot line table according to one or more embodiments.

FIG. 5B depicts an eHLT 501 according to one or more embodiments. The eHLT 501 is a structure with extended metadata related to hot cache line interactions where such information can be made available to a program product (e.g., a software application). The metadata can include the relative hotness of sub-cache line segments, the types of operations causing cache line contentions, internal core actions taken on the cache line, program product accessible interfaces, and/or the like, including combinations and/or multiples thereof.

The eHLT 501, as compared to the HLT 500, additionally tracks state information related to entries and expands on the ability to create entries based on more than the cross-core intervention. For example, entries in the eHLT 501 can be created in the following situations: a sub-cache line hot segment offset (e.g., including within L1 cache use); access patterns (e.g., instruction (I) vs. data (D)I vs. I/O, etc. (e.g., some architectures use a split L1 cache, meaning there is a separate physical cache for program instructions (LII) and data (LID))); latencies of event resolution (e.g., long latency without cross-invalidates indicates address contention issues); processor cache hierarchy contention (e.g., direct reporting of non-cross-invalidates full or partial address compares); logical partition (LPAR) identifier (ID) (e.g., for surfacing addresses to customers/users), and/or the like, including combinations and/or multiples thereof.

Additional data provides insights into why and where the cache line is hot. For example, there are four bytes touched within a cache line, the contention is related to an intersection of ExPreFetch and I-Fetch, the relative penalty (e.g., wait time) to access the structure (which is insightful for operating system dispatch issues), contention in the processor cache hierarchy is detected but not intervention related (e.g., hot lines are not always L1 cache to L1 cache contended), and/or the like, including combinations and/or multiples thereof.

The eHLT 501 provides support for firmware and operating system polling to enable on the fly analysis. This opens the hatch for profile directed feedback at the hardware level.

Figure 6:
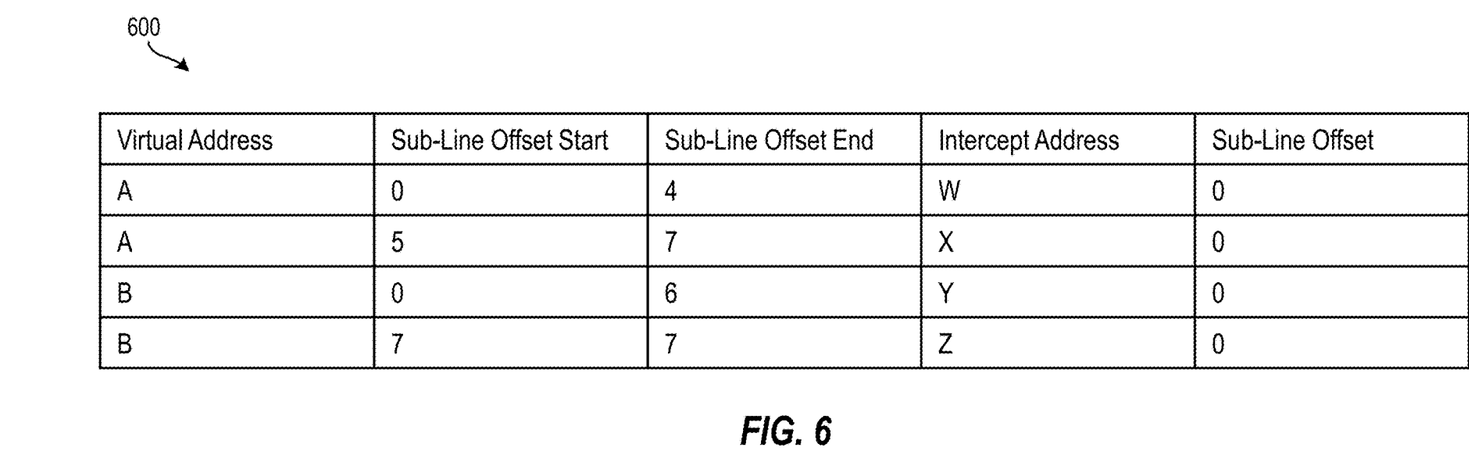
FIG. 6 depicts a virtual address intercept table according to one or more embodiments.

One or more embodiments described herein also provide a virtual address intercept table (VIT) that maps virtual addresses by sub-cache line offsets to independent absolute addresses. For example, FIG. 6 depicts a VIT 600 according to one or more embodiments. The VIT 600 stores a virtual address, a sub-line offset start value, a sub-line offset end value, an intercept address, and an intercept sub-line offset, as shown.

According to one or more embodiments, the VIT 600 is a hardware structure that enables mapping virtual addresses by sub-cache line offsets to independent absolute addresses. The VIT 600 enables breaking up accesses on one virtual address into multiple independent absolute addresses by offset position. Sections of a cache line that are not mapped are treated as an access to the original cache line. For example, the VIT 600 remaps virtual address A, OWs 0 to 4 map to absolute address W. Further, the VIT 600 remaps virtual address A, OWs 5-7 maps to absolute address X. The VIT 600 does not remap virtual address A, OW 3; instead, the hardware translates to absolute address A. Similarly, virtual address B OWs 0 to 6 are mapped to absolute address Y and virtual address B OW7 is mapped to absolute address Z.

Figure 7:
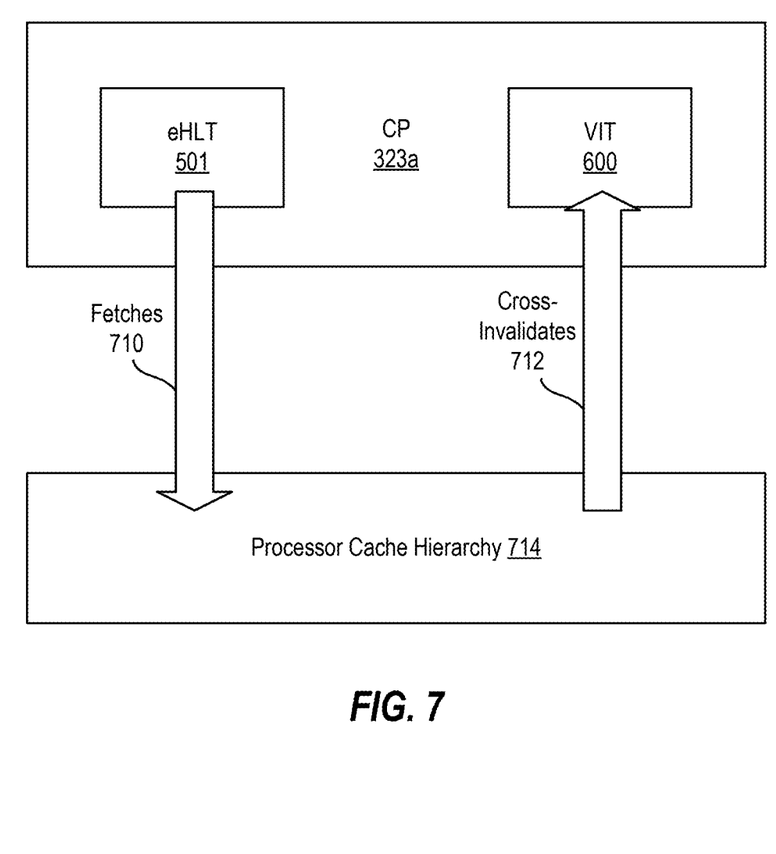
FIG. 7 depicts a central processing chip of the drawer of FIG. 4 according to one or more embodiments.

FIG. 7 depicts a central processing chip (e.g., CP chips 323a) of the drawer 302 of FIG. 4 according to one or more embodiments. The CP chips 323a utilizes the eHLT 501 and the VIT 600 to provide for dynamically segmenting one cache line address space into multiple sub-cache lines at the hardware level to reduce the amount of address contention requests encounter in an SMP system. According to one or more embodiments, the contention detection leverages the eHLT 501 as a tracking table that tracks how often a line returned to a given processor was pulled away from another active processor's L1 cache. According to one or more embodiments, the contention detection leverages the eHLT 501 that tracks latencies and access offsets of cache line accesses to determine sub-optimally performing line segments. According to one or more embodiments, the cache line segmenting approach leverages a virtual address remapping table (e.g., the VIT 600) to remap virtual addresses into independent virtual and absolute address spaces. According to one or more embodiments, the sub-cache line segmenting is performed via a program product prior to or at program execution. According to one or more embodiments, results are accessible to a program product. One or more embodiments described herein can provide for dynamically combining portions of multiple cache line address spaces into one cache line at the hardware level to optimize data structure access patterns. For example, the determining whether to combine portions of multiple cache line address spaces into one cache line can be based on the heuristic patterns determined using the eHLT 501.

In FIG. 7, the eHLT 501 of the CP chips 323a tracks cross-core contended cache lines (e.g., cross-invalidates 712), offsets, and other metadata, as described herein. A firmware component of the CP chips 323a polls the eHLT 501 in each processor (e.g., each of the CPs of a CP cluster, each of the CPs of a drawer, or each of the CPs of a system) and aggregates contention information. The aggregated contention information is then used to update the VIT 600 to break-up contended addresses. The firmware purges translation lookaside buffers (TLBs) to invalidate the old mappings for candidate eHLT entries in the L1 and the TLB and remaps the addresses via the VIT. Then the eHLT 501 can be cleared.

When the system resumes processing (e.g., processing fetches 710 to a processor cache hierarchy 714), the eHLT 501 tracks new cross-core contended cache line offsets and other metadata as described herein, and the firmware poles the eHLT in each processor. If the VIT mapping is successful, contention is reduced and no additional action is required, thus improving the functioning of the processing system. If the VIT remapping is unsuccessful, the contention remains the same (e.g., no reduction in system performance), and the firmware can make additional attempts or eliminate unsuccessful remapping, which further improves system performance.

One or more embodiments described herein provides for dynamically segmenting one cache line address space into multiple sub-cache lines at the hardware level to reduce the amount of contention requests encountered in an SMP system. According to one or more embodiments, the contention detection leverages the eHLT 501 as a tracking table that tracks how often a line returned to a given processor was pulled away from another active processor's L1 cache. According to one or more embodiments, the contention detection leverages the eHLT 501 that tracks latencies and access offsets of cache line accesses to determine sub-optimally performing line segments. According to one or more embodiments, the cache line segmenting approach leverages a virtual address remapping table (e.g., the VIT 600) to remap virtual addresses into independent virtual and absolute address spaces. According to one or more embodiments, the sub-cache line segmenting is performed via a program product prior to or at program execution.

Figure 8:
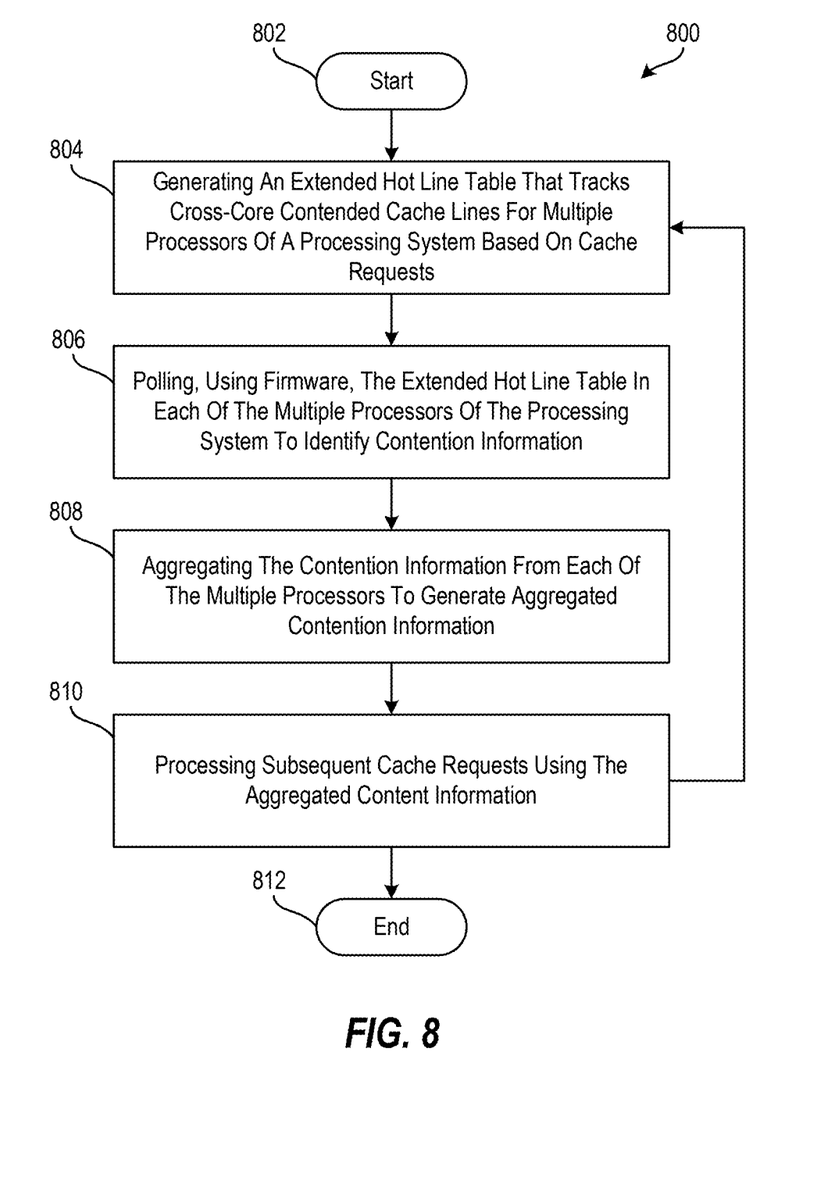
FIG. 8 depicts a flow diagram of a method for detecting and mitigating false structure sharing within a cache line according to one or more embodiments.

Turning now to FIG. 8, a flow diagram of a method 800 for detecting and mitigating false structure sharing within a cache line is provided, according to an embodiment. The method 800 can be performed by any suitable computing system, device, or environment, such as those described herein (e.g., the computing environment 100 and/or the computer 101 of FIG. 1). According to one or more embodiments, the method 800 is performed, in whole or in part, using the theorem prover engine 150 of FIG. 1.

The method 800 begins at block 802. At block 804, the computer 101 generates an extended hot line table (e.g., the eHLT 501) that tracks cross-core contended cache lines for multiple processors (e.g., for each of the CP chips 323a, 323b, 323c of the CP cluster 321) of a processing system based on cache requests. That is, as cache requests are received, the computer 101 generates the eHLT. According to one or more embodiments, the eHLT 501 stores metadata related to hot cache line interactions where such information can be made available to a program product. The metadata can include the relative hotness of sub-cache line segments, the types of operations causing cache line contentions, internal core actions taken on the cache line, program product accessible interfaces, and/or the like, including combinations and/or multiples thereof.

As shown in FIG. 5B, the eHLT 501 stores at least state information for a cross-core contended cache line, the state information indicating why and where a cache line is a hot cache line.

At block 806, the computer 101, using firmware, polls the eHLT in each of the multiple processors of the processing system to identify contention information. Contention information includes addresses with multiple hot segments, for example.

At block 808, the computer 101 aggregates the contention information from each of the multiple processors to generate aggregated contention information. For example, the computer 101 aggregates the view from multiple processors perspective (e.g., partition or system scope) given each core identifies potentially different hot offsets. According to one or more embodiments, the computer 101 initiates a zone quiesce, invalidates L1 cache entries and TLBs mappings for identified addresses, and updates the VIT (e.g., the VIT 600) with mappings for new "virtual to absolute" address mappings.

At block 810, the computer 101 continues processing subsequent cache requests using the aggregated contention information. For example, on subsequent processor fetches to VIT mapped addresses, only the VIT range of the sub-cache line is marked valid while fetches targeting blocks not in the VIT/L1 cache are treated as misses to independent addresses. If VIT remapping is successful, relative cache line hotness is reduced, and no further action is taken. This provides the same net goal of breaking up hot cache lines into multiples. If VIT remapping is unsuccessful, the structure may naturally be hot, and the firmware can decide whether to recombine or leave as-is depending on the number of core HLT's continuing to report the same address.

According to one or more embodiments, the method 800 includes dynamically segmenting one cache line address space into multiple sub-cache lines at the hardware level to reduce the amount of contention requests encountered in an SMP system.

Additional processes also may be included, and it should be understood that the processes depicted in FIG. 8 represent illustrations, and that other processes may be added or existing processes may be removed, modified, or rearranged without departing from the scope of the present disclosure. It should also be understood that the processes depicted in FIG. 8 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

According to one or more embodiments, the eHLT provides significant improvement in terms of isolating difficult to diagnose issues that are a combination of software, firmware, and hardware by providing live per-core detailed instrumentation information for a set of addresses. This approach separates prior dependency on "entry" to "inaction" as information is power. "Action" or "inaction" for complex behavior is moved to firmware or software.

The VIT enables the firmware to dynamically break-up or combine multiple virtual address segments into new absolute address locations to reduce or eliminate the need for manual interventions. For example, decades old COBOL code has a shared structure that is not tolerate of new system designs. Often, source code is not even available, and thus automatic binary optimizer (ABO) fixes are not possible because visibility only exists at runtime. As another example, for Linux cloud applications ported from x86 architectures to the IBM z architecture, there may exist a system scaling issue in independent software vendor (ISV) code. If the ISV is unwilling to address the issue to customize for the IBM z architecture, one or more embodiments describe herein provide for addressing hot line cache contentions in such cases, making the ISV code function desirably on the IBM z system. Moreover, one or more embodiments described herein provide approaches that adapt, learn, and improve over time because often cache contention issues manifest during peak windows, making traditional approaches difficult, inefficient, and expensive in terms of computational resources.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:
generating an extended hot line table that tracks cross-core contended cache lines for multiple processors of a processing system based on cache requests, the extended hot line table storing at least metadata for a cross-core contended cache line;
polling, using firmware, the extended hot line table in each of the multiple processors of the processing system to identify contention information;
aggregating the contention information from each of the multiple processors to generate aggregated contention information;
processing subsequent cache requests using the aggregated contention information; and
generating, using the aggregated contention information, a virtual address intercept table.

2. The computer-implemented method of claim 1, wherein the virtual address intercept table remaps virtual addresses by sub-cache line offsets to independent virtual and absolute address spaces.

3. The computer-implemented method of claim 2, wherein the virtual address intercept table stores a virtual address, a sub-line offset start value, a sub-line offset end value, an intercept address, and a sub-line offset value.

4. The computer-implemented method of claim 2, wherein the remapping of virtual addresses by sub-cache line offsets is performed prior to or at program execution.

5. The computer-implemented method of claim 2, further comprising making results of remapping of virtual addresses by sub-cache line offsets available to a program product.

6. The computer-implemented method of claim 1, wherein each of the multiple processors comprises multiple cores, and wherein each of the multiple cores includes a dedicated extended hot line table.

7. The computer-implemented method of claim 1, wherein the metadata is related to hot cache line interactions where such information is made available to a program product.

8. The computer-implemented method of claim 7, wherein the metadata comprises a relative hotness of sub-cache line segments, types of operations causing cache line contentions, internal core actions taken on the cross-core contended cache lines, and program product accessible interfaces.

9. The computer-implemented method of claim 1, further comprising making the contention information available to a program product.

10. A system comprising:
a memory comprising computer readable instructions; and
a processing device for executing the computer readable instructions, the computer readable instructions controlling the processing device to perform operations comprising:
generating an extended hot line table that tracks cross-core contended cache lines for multiple processors of a processing system based on cache requests, the extended hot line table storing at least metadata for a cross-core contended cache line;
polling, using firmware, the extended hot line table in each of the multiple processors of the processing system to identify contention information;
aggregating the contention information from each of the multiple processors to generate aggregated contention information;
processing subsequent cache requests using the aggregated contention information; and
generating, using the aggregated contention information, a virtual address intercept table.

11. The system of claim 10, wherein the virtual address intercept table remaps virtual addresses by sub-cache line offsets to independent virtual and absolute address spaces.

12. The system of claim 11, wherein the virtual address intercept table stores a virtual address, a sub-line offset start value, a sub-line offset end value, an intercept address, and a sub-line offset value.

13. The system of claim 11, wherein the remapping of virtual addresses by sub-cache line offsets is performed prior to or at program execution.

14. The system of claim 11, wherein the operations further comprise making results of remapping of virtual addresses by sub-cache line offsets available to a program product.

15. The system of claim 10, wherein each of the multiple processors comprises multiple cores, and wherein each of the multiple cores includes a dedicated extended hot line table.

16. The system of claim 10, wherein the metadata is related to hot cache line interactions where such information is made available to a program product.

17. The system of claim 16, wherein the metadata comprises a relative hotness of sub-cache line segments, types of operations causing cache line contentions, internal core actions taken on the cross-core contended cache lines, and program product accessible interfaces.

18. The system of claim 10, wherein the operations further comprise making the contention information available to a program product.

19. A computer program product comprising:
a set of one or more computer-readable storage media;
program instructions, collectively stored in the set of one or more storage media, for causing a processor set to perform the following computer operations:
generating an extended hot line table that tracks cross-core contended cache lines for multiple processors of a processing system based on cache requests, the extended hot line table storing at least metadata for a cross-core contended cache line;
polling, using firmware, the extended hot line table in each of the multiple processors of the processing system to identify contention information;
aggregating the contention information from each of the multiple processors to generate aggregated contention information;
processing subsequent cache requests using the aggregated contention information; and
generating, using the aggregated contention information, a virtual address intercept table.

20. The computer program product of claim 19, wherein the virtual address intercept table remaps virtual addresses by sub-cache line offsets to independent virtual and absolute address spaces.

* * * * *